United States Patent [19]

Runion

[11] Patent Number: 5,101,766
[45] Date of Patent: Apr. 7, 1992

[54] FEEDER PAN

[76] Inventor: Derwood L. Runion, Rte. 2, Box 300, Timberville, Va. 22853

[21] Appl. No.: 530,272

[22] Filed: May 30, 1990

[51] Int. Cl.⁵ .............................................. A01K 39/00
[52] U.S. Cl. ........................................................ 119/53
[58] Field of Search ...................... 119/52.1, 52.4, 53, 119/53.5

[56] References Cited

U.S. PATENT DOCUMENTS

| | | |
|---|---|---|
| Re. 25,589 | 6/1964 | Hostetler et al. . |
| 364,557 | 6/1887 | Walin . |
| 570,569 | 11/1896 | Smith . |
| 905,393 | 12/1908 | Webb . |
| 984,980 | 2/1911 | Taylor . |
| 1,069,943 | 8/1913 | Haffey . |
| 1,131,491 | 3/1915 | Drake . |
| 1,565,117 | 12/1925 | Stabbert . |
| 1,699,501 | 1/1929 | McCartney . |
| 2,513,200 | 6/1950 | Pax ..................... 119/53.5 |
| 2,681,639 | 6/1954 | Littlefield . |
| 2,709,417 | 3/1955 | Breinbeck . |
| 2,789,534 | 4/1957 | Landgraf . |
| 2,804,844 | 6/1957 | Gigliotti . |
| 2,875,729 | 3/1959 | Gibser . |
| 2,884,899 | 5/1959 | Jackes et al. . |
| 2,933,064 | 4/1960 | Geerlings . |
| 2,941,506 | 6/1960 | Fulton . |
| 3,085,552 | 4/1963 | Pilch . |
| 3,102,511 | 9/1963 | Atcheson . |
| 3,105,463 | 10/1963 | Pilch . |
| 3,203,397 | 5/1965 | Henry . |
| 3,211,131 | 10/1965 | Klein . |
| 3,230,933 | 1/1966 | Myers et al. . |
| 3,350,255 | 7/1967 | Scott et al. . |
| 3,386,690 | 6/1968 | Hostetler . |
| 3,388,690 | 6/1968 | Hostetler .............................. 119/53 |
| 3,389,689 | 6/1968 | Van Huis . |
| 3,408,988 | 11/1968 | Lee . |
| 3,476,087 | 11/1969 | Scott et al. . |
| 3,485,215 | 12/1969 | Scott et al. . |
| 3,490,419 | 1/1970 | Van Huis . |
| 3,511,215 | 5/1970 | Myers . |
| 3,566,843 | 3/1971 | Van Huis et al. . |
| 3,585,970 | 6/1971 | Scott et al. . |
| 3,811,412 | 5/1974 | Murto et al. . |
| 3,911,868 | 10/1975 | Brembeck . |
| 3,971,340 | 7/1976 | Allen . |
| 4,070,990 | 1/1978 | Swartzendruber . |
| 4,216,742 | 8/1980 | Kirchhofer .................... 119/57.4 X |
| 4,348,988 | 9/1982 | Lawson ................................ 119/53 |
| 4,476,811 | 10/1984 | Swartendruber ................. 119/53 X |
| 4,488,509 | 12/1984 | Awalt .................................... 119/53 |

FOREIGN PATENT DOCUMENTS

| | | | |
|---|---|---|---|
| 133950 | 8/1949 | Australia .......................... 119/52.4 |
| 2323825 | 1/1974 | Fed. Rep. of Germany ........ 119/53 |
| 2652788 | 5/1978 | Fed. Rep. of Germany ..... 119/52.1 |
| 2483652 | 12/1981 | France ................................... 119/53 |
| 2525072 | 10/1983 | France ................................... 119/53 |
| 733583 | 5/1980 | U.S.S.R. ............................. 119/52.4 |
| 2080663 | 2/1982 | United Kingdom .................. 119/53 |
| 2156194 | 10/1985 | United Kingdom .................. 119/53 |

Primary Examiner—Gene Mancene
Assistant Examiner—R. Thomas Price

[57] ABSTRACT

A feeder having a drop tube threadably received in a central bore of a grillwork to adjust the height of the drop tube. A unique lock is provided for the height adjustment and to prevent movement of the drop tube with respect to a conveyor to which it is mounted. A split collar mounts the drop tube to the conveyor and is disassembled along the axis of the conveyor without implements. The grillworks mount the drop tube to a pan by a split circumferential flange which requires radial and axial initial forces for removal.

18 Claims, 2 Drawing Sheets

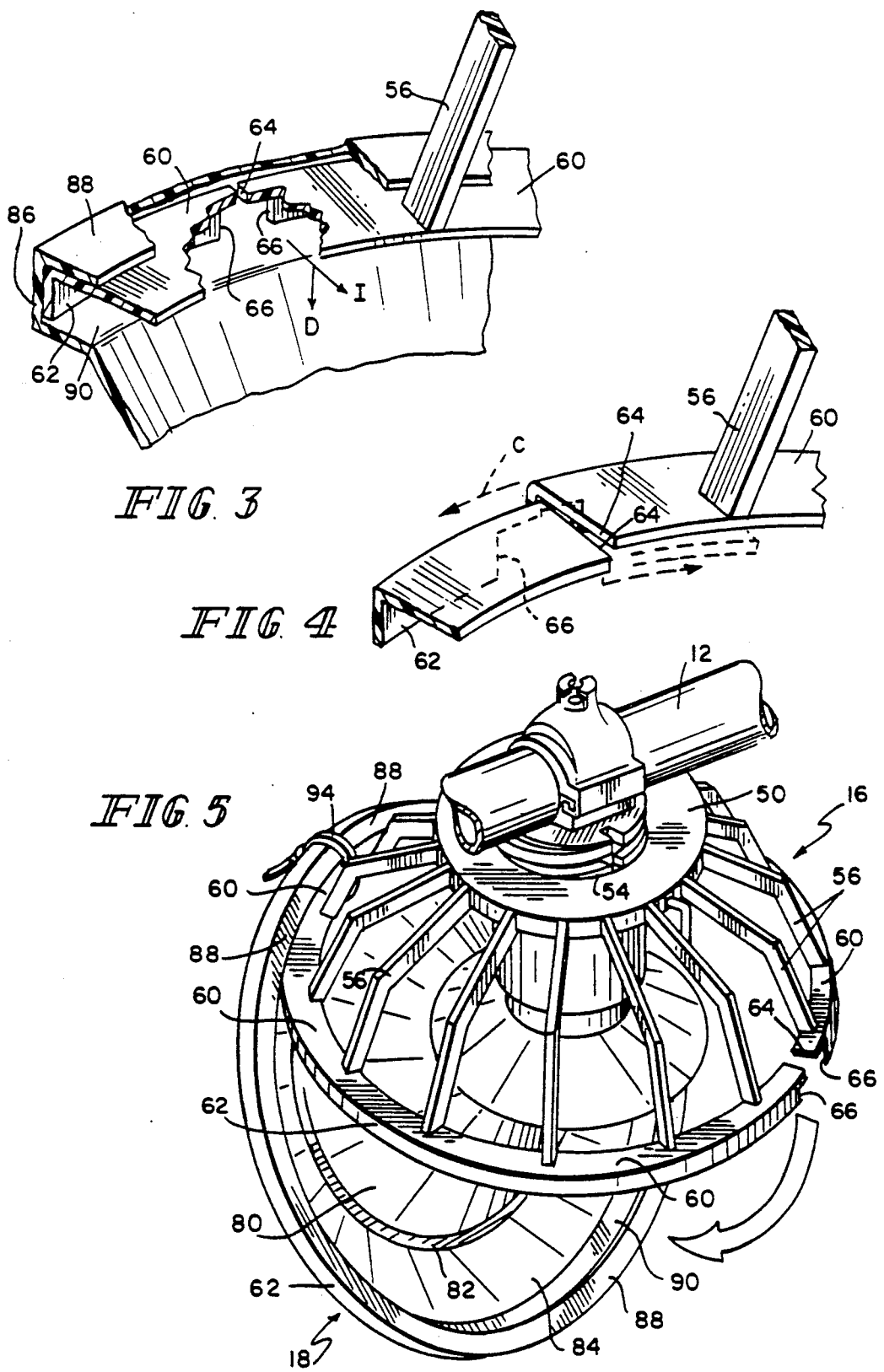

FEEDER PAN

BACKGROUND AND SUMMARY OF THE INVENTION

The present invention relates generally to animal feeding systems and more particularly, to feeder pans for poultry and the like.

The mass feeding of poultry is carried out by generally a conveyor system which distributes feed throughout an enclosure or series of enclosures in which the poultry is housed. Connected to the conveyor are a plurality of feeder pans which receive feed from the conveyor and hold the feed separated from the floor. Typical feeder pans include some form of drop tube which directs the feed from the conveyor down to the pan. The amount of feed to be dispensed is determined by adjusting the separation between the distal end of the drop tube and the pan. Grillwork is usually provided between the drop tube and the pan to segregate the feeding poultry.

The pan may be suspended above the floor by the conveying system or may rest on the floor.

The conveyor system generally includes a conveying tube received in a collar of the drop tube. Since the collar is generally unitary, it is difficult to remove the drop tube and its feeder pan from the conveying tube without totally disassembling the conveying tube. In the early systems, the drop tube included a flange which formed a partial cylinder and was mounted to the conveying tube by spring clips as shown in U.S. Pat. Nos. 3,085,552; 3,105,463 and 3,389,689. A two piece collar using rivets or nuts and bolts is illustrated in U.S. Pat. Nos. 3,490,419; 3,408,988 and Re 25,589. These systems were metal and generally included many elements and required a tool to assemble or disassemble.

By using molded plastic systems, the collar and drop tube became unitary. Although reducing the number of parts, these systems are not easily removed from the conveying tube. Also there is generally no provision for locking the drop tube and its associated pan on the conveying tube to prevent it from moving axially along the axis of the conveying tube or to rotate and pivot about the conveying tube. Although the locating tab 42 in U.S. Pat. No. 3,408,988 may provide some restriction of the axial movement, the two piece collars of the prior art provided little, if any, resistance to pivotal motion. In time, the spring clips and other circumferential biasing means permit movement. The unitary, molded structure provides no resistance to motion.

The adjustment of the amount of feed provided into the pan is determined by adjusting the height of the distal end of the drop tube in respect to the bottom of the pan. Earlier models used a screw with a crank to adjust the height as illustrated in U.S. Pat. Nos. 905,393; 984,980; 2,933,064; and 3,102,511. A threaded collar for receiving a threaded neck of a supply container is illustrated in U.S. Pat. No. 1,565,117. An adjustable sleeve gate on the end of a supply container with a notched slot is illustrated in U.S. Pat. No. 570,569.

Another style of feeding pans made the drop tube of two telescopic portions. The first portion includes a collar which receives the conveyor and is mounted to the pan by a grillwork. The second portion includes a foot structure which rests on the bottom of the pan and adjusts the height of the second tube portion distal end from the pan. Typical examples are U.S. Pat. Nos. 3,388,690 and 3,811,412. These systems provided a latch and detent with spiral guides in a metal sleeve or second portion. One piece molded versions are illustrated in U.S. Pat. Nos. 3,511,215; 3,911,868 and 4,070,990. In these models, the feet offer the only mounting of the drop tube to the pan and no grillwork is provided. Other examples are U.S. Pat. Nos. 2,941,506 and 3,566,843.

Another feed pan includes an integral drop tube with a flared end and an adjustable collar threadably received in the center opening of the grillwork. The adjustable collar forms a stop for the drop tube such that when it is positioned and supported by the conveyor, a separation of the distal end of the drop tube from the pan is defined by the stop. When the pan is placed on the ground and not supported by the conveyor, the distal end of the drop tube rests on the pan, thereby closing the bottom opening. A pan of this design is described in U.S. Pat. No. 4,476,811. The adjustment requires two hands: one to manipulate the collar and the second to hold the pan.

The grillwork of U.S. Pat. No. 3,388,690 includes a plurality of spokes which individually engage the pan and having a ring connecting adjacent the outer periphery of the spokes. The ring is discontinuous so that the grillwork can be removed by reducing the diameter of the ring by pulling two of the spokes circumferentially towards each other. No provision is provided to maintain the feed within the pan if the pan should tip. Also, since the grillwork is totally separable from the pan to allow cleaning, requires two hands to reassemble the pan. Other examples of removably mounting the grillwork to the circumference of the pan are illustrated in U.S. Pat. Nos. 2,709,417; 3,230,933 and 3,585,970. These are in addition to those previously discussed for other features.

The peripheral ends of the spokes of the grillwork of U.S. Pat. No. 4,476,811 are connected by continuous flange having generally F-shaped cross-section. The two parallel legs of the F-shaped flange receive the edge of the pan and snap thereon. The snap-on structure is very difficult to engage and generally requires a hammer. A hinge is provided such that when the grillwork is removed from the pan for cleaning the pan and grillwork do not totally separate.

Thus, it is an object of the present invention to provide a feeder pan which is adjustable with one hand.

Another object of the present invention is to provide a feeder pan which may be removed from a conveyor system without implements and disassembly of the conveyor.

Another object of the present invention is to provide a feeder pan which is readily disassembled for cleaning and may be reassembled without any implements.

An even further object of the present invention is to provide a feeder pan which is readily disassembled and includes a guard to prevent feed from spilling from the pan when tipped.

An even further object of the present invention is to provide a feeder pan which may be locked to prevent relative movement between the feeder pan and the conveyor system.

These and other objects of the invention are achieved by an adjustment mechanism having first and second threadably interconnected support portions integral with the central bore of the grillwork and the drop tube respectively for adjusting the distance of between the distal end of the drop tube and the pan. A first locking mechanism locks the drop tube with respect to the grillwork and includes a detent extending through a channel in the grillwork from the exterior to the interior center channel and a biasing element biasing detent toward the drop tube. The drop tube includes an axial groove on its outer surface for receiving the detent to lock the pan in specific positions relative to the drop tube. A pair of channels and axial grooves are provided.

The drop tube has, at its proximal end, a split collar including a radial bore which receives the conveyor. The split collar includes a first portion integral with the drop tube and a second portion removably mounted to the first portion so as to be removed along the axis of the radial bore. This allows dismounting of the pan from the conveyor without implements and disassembly of the conveyor. The split collar includes a lock which extends through the collar and engages the conveyor in the radial bore for preventing movement of the feeder pan with respect to the conveyor. This prevents not only swinging of the pan with respect to the conveyor tube, but also movement along the axis of the radial bore.

The grill is a spider shape having a hub with a central bore for receiving the drop tube and an outer peripheral, circumferential flange removably mounting the grill to the pan in a circumferential inwardly facing groove in the pan. The flange has a L-shaped cross-section with a vertical leg received in the circumferential groove and a horizontal leg extending substantially from the circumferential groove. This provides a horizontal lip around the top edge of the pan to prevent spillage of feed from the pan when the pan is tilted as well as during feeding of the fowl.

The flange includes a slit therein to permit removal of the flange from the circumferential groove. The slit, in the horizontal leg, is narrow so as to provide, effectively, a continuous horizontal flange while permitting removal of the flange from the circumferential groove using radial and axial initial forces. The slit is generally diagonally opposed a hinge which is a loop which extends through an opening in the pan below the circumferential groove and encompasses the flange. The hinge causes the pan to ride on the flange when pivoting to aid alignment during closing.

Other objects, advantages and novel features of the present invention will become apparent from the following detailed description of the invention when considered in conjunction with the accompanying drawings.

BRIEF DESCRIPTION OF THE DRAWINGS

FIGS. 3 and 4 are exploded partial perspective of the removal process of the grillwork from the pan;

FIG. 5 is a perspective view of the grillwork and the pan in a dismounted cleaning position.

DETAILED DESCRIPTION OF THE DRAWINGS

Figure 1:
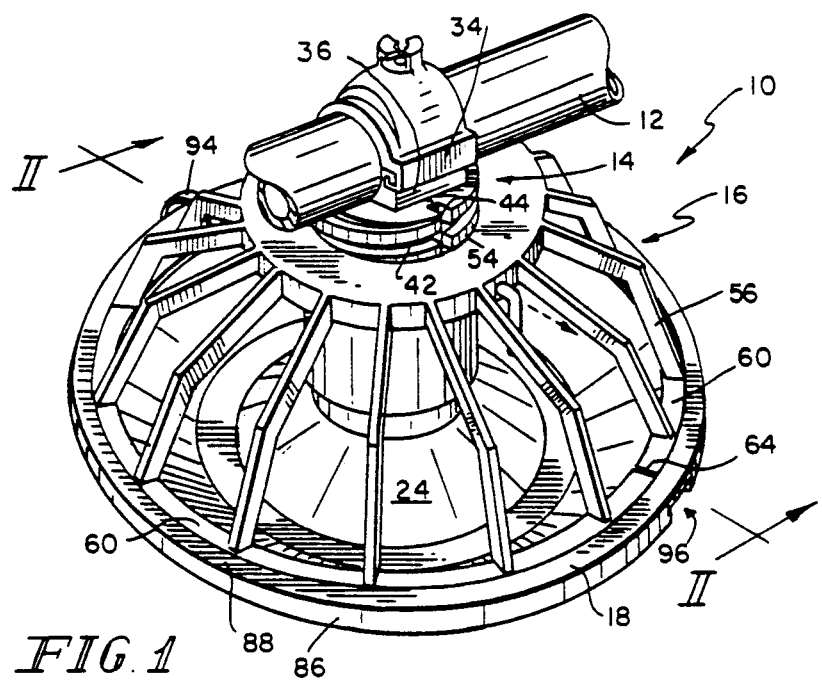
FIG. 1 is a perspective view of feeding pan of the present invention installed on a conveyor tube.
Figure 2:
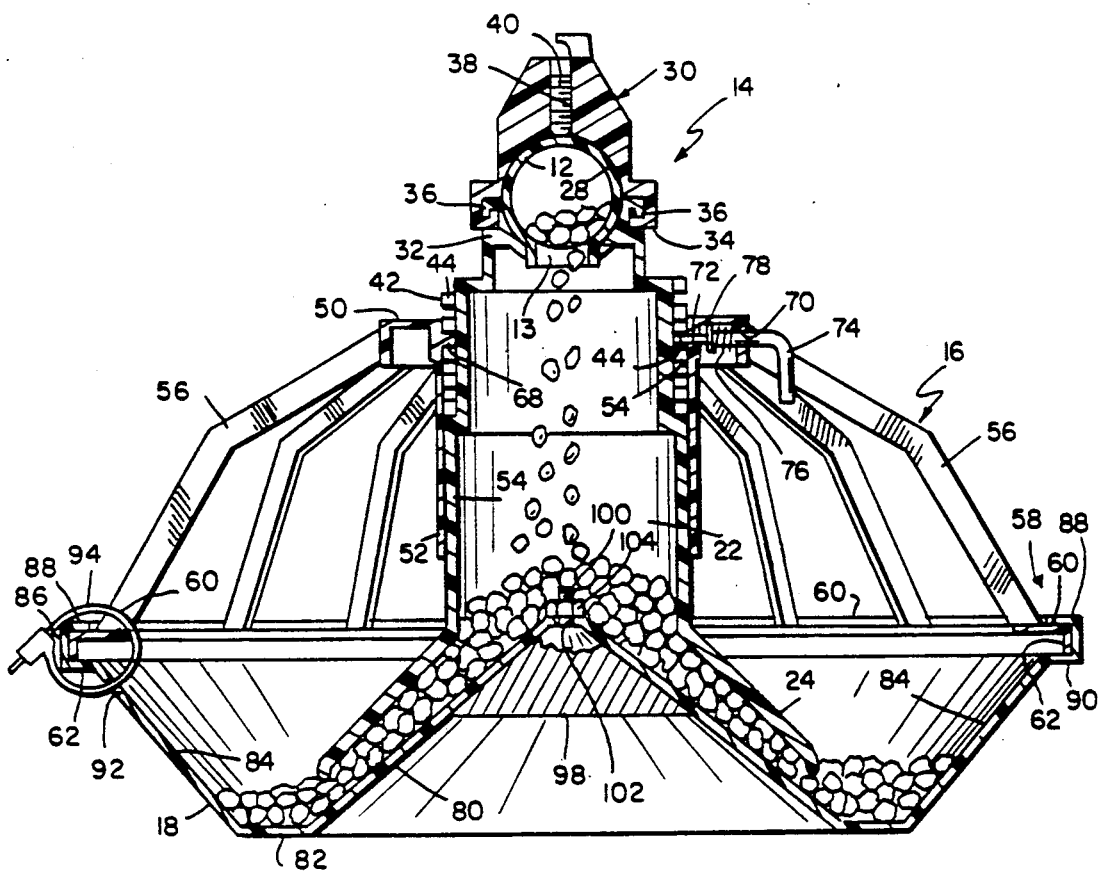
FIG. 2 is a cross-section taken along Lines II—II of FIG. 1.

As illustrated in FIG. 1, a feeder 10 is mounted about a conveyor tube 12 and includes a drop tube 14 received in the conveyor tube 12 extending through a grillwork 16 to the distal end adjacent to a pan 18. The grillwork 16 is mounted to the pan 18 at its outer periphery. The drop tube 14, as illustrated in FIG. 2, has an internal axial bore 22 and is flared at its distal end 24. The proximal end of the drop tube 14 includes a split collar including an interior radial bore 28 which is transverse to and intersects the axial bore 22. The conveyor tube 12 extends through the radial bore 28.

The collar 26 is a split collar including a removal portion 30 mounted to a collar portion 32 which is integral with the proximal end of the drop tube 14. The collar portion 32 includes a pair of ears or channels 34 along opposed lateral sides which are received in channels 36 of the collar portion 32 which is integral with the tube 20. The channels 34 and 36 are complementary mating channels having an axis parallel to the axis of the conveying tube 12. By providing a split collar with the sliding interrelationship of the channels 34 and the channels 36 allows the feeder 10 to be removed from the conveyor 12 without implements and dismantling of the conveyor. The split collar portion 32 is removed by sliding the collar portion 32 with respect to the upper portion 30 along the axis of the conveyor 12.

Since the pan and its tube 20 do not have to be moved along the axis of the conveyor tube 12, the conveyor tube 12 may include a lip 13 about the opening 11 wherein feed is provided down the drop tube 14. The lip 13 can act as a stop to prevent movement of the feeder 10 along the axis of the conveyor 12. It should be noted that the conveying element of the conveyor tube 12 is not shown. To further restrict the movement between the feeder 10 and the conveyor tube 12, a bore 38 is provided and a lock 40, illustrated as screw, is provided therein. The screw 40 is threadably received in the bore 38. If it is desirable for the feeder 10 to rotate about the conveyor tube 12, the screw 40 may be recessed into the opening 38 or non-engaged into the conveyor 12. The screw 40 engages the conveyor tube 12 and not only prevents movement along the axis of the conveyor tube 12 but will also prevent rotation or swinging of the feeder 10 about the conveyor tube 12 during feeding.

The proximal portion of the tube 20 includes an exterior thread 42 which mates with internal threads on the grillwork 16 and allows for rotational adjustment of the distal end of the drop tube 14 with respect to the pan 18. An axial groove 44 is provided on the drop tube portion 20 to define locking position of height adjustment in combination with a detent.

The grillwork 16 includes a hub 50 with a downward extending sleeve 52 and an internal bore 54 which receives tube portion 20 of the drop tube 14. The sleeve 52 cooperates with the flare 24 of the drop tube 14 to prevent the drop tube from being removed when the grillwork 16 is mounted to the pan 18. A plurality of legs 56 extend down from the hub 50 in a spider-like fashion to an outer circumferential flange 58 at its outer periphery. The flange 58 includes a horizontal portion 60 and a vertical portion 62.

An interior thread 68 is along the interior surface of the bore 54 at the hub 50. The thread 68 cooperates with the threaded portion 44 of the drop tube 14 to provide a threaded interconnection and allows for adjustment of the height of the distal end of the flare 24 with respect to the bottom of the pan 18. When the drop tube 14 is mounted to the conveyor 12, it is stationary thereto and thus rotation of the grillwork 16 and pan 14 with one hand will adjust the height of the drop tube 14 with respect to the pan 18.

To lock the position of the drop tube 14 with respect to the pan 18, a lock is provided. The lock includes a detent 74 extending in a channel defined by openings 68 and 70 of the hub 50 to allow the detent to extend from an outer edge to the interior bore 54 and engage the outer surface of the tube 20 of the drop tube 14. A spring seat or stop 78 is mounted to the detent 74 and the spring 76 rests on the stop 78 and an interior wall of the hub 50. The spring 76 biases the detent 74 onto the outer surface of the tube 20. Once the detent 74 becomes aligned with the axial groove 44 of the tube 20, it extends further and locks the drop tube 14 with respect to the hub 50 and prevents any further rotation relative thereto. The detent 74 must then be reset to permit any further rotation.

As shown, the axial groove 44 would be across the threads 42 and need not extend into the surface of the tube portion 20 below the depth of the area between the threads 41. In this instance, the detent 74 would ride on the outer edges of the threads 42 until it reaches the axial groove 44. Depending upon the number of locking positions required, more than one axial groove may be provided. In the illustrated embodiment, two grooves 44 are provided diametrically opposed.

Similarly because of the possible wear and tear of the detent on the channels defined by openings 70 and 72, a second channel is defined diametrically opposed from the first channel such that the detent 74 may be mounted in a second alternative position. The position of the channels defined by opening 70 and 72 lie on an axis which is transverse to the radial bore 28 so that the detent does not lie under the conveyor tube 12 and therefore provide easy access.

The flange 58 is generally L-shaped in cross-section, having horizontal portion 60 to which the legs 56 are connected and a vertical portion 62. The horizontal portion 60 extends substantially into the interior of the pan 18 and acts as a lip to prevent the spillage of feed from the pan. As is evident from FIG. 1, the horizontal portion 60 of the flange 58 provides a continuous ring or rim around the circumference of the pan 18. As illustrated in FIG. 3, the horizontal flange 60 includes a very narrow slit 64 while the vertical legs 62 include a wider slit 66. The description of the importance of the slits to the removal of the grillwork 16 from the pan 18 will be discussed after describing the pan 18.

The pan 18 includes a central conical portion 80 having a steep angle substantially matching the angle of the flare 24 of the drop tube 14. A narrow floor engaging portion 82 extends horizontally from the bottom of the central conical portion 80 and has extending up therefrom walls 84. Again the angle of the wall 84 is substantially steep. By maintaining the radial length of the horizontal floor engaging portion 82 relatively short and by keeping the angles of the cone 80 and the outer wall 84 substantially high, the height of the feed available in the pan 18 exterior of the flange portion 24 is substantially higher than that in previous pan designs. This reduces the amount of feed that must be presented to produce a given height within the pan 18. As is well known in the industry, the distance between the distal end of the flared portion 24 of the drop tube 14 from the bottom wall 82 of the pan 18 determines the repose and therefore the height of material within the pan.

An inwardly facing circumferential groove 86 runs along the top of the wall 84 and includes a top horizontal portion 88 and a bottom horizontal portion 90. The top leg 88 is shorter than the bottom leg 90. The circumferential groove 86 receives the flange 58 of the grillwork 16 and retains the grillwork 16 and the drop tube 14 mounted to the pan 18. A combination of the circumferential groove 86 and the horizontal portion 60 of flange 58 provide a recess and lip to prevent the spillage of feed from the pan 18 even when it is substantially tilted.

A hinge, illustrated as a loop 94 passes through an opening 92 in the wall 84 of the pan 18 below the circumferential groove 86 and extends around the flange 58. The loop 94 is positioned diametrically opposed to the slit 64 and 66 in the flange 58 such that upon manipulation of the flange to unlock it from the circumferential groove 86, the pan 18 can fall pivoting about the loop 94. This will allow cleaning of the pan without separation from the grillwork 16. After cleaning, the flange 58 is reinserted into the circumferential groove 86. A drainage port 96 is provided in the vertical wall of the circumferential groove 86 of the pan 18 opposite the hinge loop 94. This allows drainage of the wash water when the pan 18 is in the drop down mode of FIG. 5.

The loop 94 is sufficiently tight such that the portion of the flange 58 encompassed by the loop 94 will cause the top wall 88 of the circumferential groove 86 to ride up on to the horizontal portion 60 of the flange 58 in the drop down mode as illustrated in FIG. 5. Upon remounting of the pan 18 on the grillwork 16, by rotation of the pan up to the grillwork, the portion of the flange 58 encompassed by the loop 94 will automatically register within the circumferential groove 86. The remainder of the circumference of the flange 58 will then be positioned within the circumferential groove 86 with the horizontal portion 60 of the flange below the top portion 88 of the circumferential groove. The grillwork 16 is then locked in place by exerting a circumferential force in opposite directions at the split ends of the flange 58 until the slit edges 64 of the horizontal flange 60 are abutting so as to form a continuous aligned circumferential flange.

As previously described, the horizontal portion 60 of flange 58 of the grillwork 16 provides a continuous lip. The slit 64 in the horizontal portion 60 should be almost invisible with the faces of the adjacent portion being mated. To separate the grillwork 16 from the pan 18 to allow access to the interior for cleaning, combined inward radial and downward and axial forces, illustrated by arrows I and D respectively in FIG. 3, are applied to one end of the flange 58 causing it to move inward and downward with respect to the other.

Once the horizontal leg 60 and the vertical leg 62 have moved radially inward and vertically or axially downward respectively a distance equal to their thickness, the flange has become unlocked. This position is illustrated in FIG. 4.

Next by applying a circumferential force illustrated by the Arrow C in FIG. 4, the diameter of the flange 58 is decreased and it can be removed from the circumferential groove 86. The pan will fall to the position illustrated in FIG. 5. Because of the shape of the loop 94 the top portion of the recess 86 rides up onto the horizontal surface 60 of the flange 58 adjacent to the loop 94.

By providing the detent 74 diametrically opposed the hinge 90 and in line with the slits 64 and 66, and the axial groove 44 on the outer surface of the drop tube 14 so that the extension thereof does not intersect the conveyor 12, the hinge 90 and the splits 64 and 66 will lie along a diagonal line transverse to the conveying axis of the conveyor 12 and therefore are readily accessible when the detent 70 lies within the axial groove 44. Thus loop 94 provides a rotational axis which will be parallel to the conveying axis of the conveyor 12.

Since the feeder pan is made of molded plastic, it is very light. When used for feeding larger birds, such as turkeys, it is desirable to add weight. As illustrated in FIG. 2, a weight 98 is positioned in the conical portion 80 of the pan 18 and includes a fastener 100 extending through hole 102 of the pan and secured by a nut 104. The weight may be secured by other means including molding it or retainers for the weight into the pan 18.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A feeder to receive feed from a conveyor comprising:
    drop tube means for receiving a conveyor at a proximal end and dispensing feed at a distal end,
    pan means adjacent the distal end of said drop tube means for retaining and presenting feed;
    grill means having a central bore and being mounted to said pan means at its outer periphery; and
    adjustment means threadably interconnecting said grill means and said drop tube means respectively for adjusting the distance between the distal end of said drop tube means and said pan means as the grill means is rotated with respect to the drop tube means along the threaded adjustment means;
    locking means extending from said grill means to said drop tube means for locking rotation of said drop tube means with respect to said grill means; and
    wherein said drop tube means includes a first axial groove on the threaded interconnection and said locking means engages said groove for locking.

2. A feed according to claim 1 wherein said locking means includes a detent extending from an outer surface of said grill means to said central bore through a first channel in said grill means and biasing means for biasing said detent toward said groove.

3. A feeder according to claim 2 wherein said drop tube means includes a second axial groove on the threaded connection; and
    wherein said grill means has a second channel means extending from said outer surface of said grill means to said second groove.

4. A feeder according to claim 2 wherein said first channel has an axis transverse to a conveying axis of said conveyor.

5. A feeder according to claim 1 wherein said locking means includes biasing means for biasing said detent toward said first axial groove.

6. A feeder according to claim 1 wherein;
    said drop tube means, said pan means and said grill means are plastic; and wherein
    a weight is mounted within said conical portion of said pan.

7. A feeder to receive feed from a conveyor comprising:
    pan means for retaining and presenting feed;
    grill means having a central bore and being mounted to said pan means at an outer periphery;
    drop tube means, extending through said central bore, for receiving a conveyor at a radial bore at a proximal end and dispensing feed at a distal end of an axial bore adjacent to said pan means, and
    said drop tube means includes a split collar including said radial bore and having a first portion and a second portion connected thereto and removably mounted with respect to the first portion to allow said first portion to be moved relative to said second portion along the axis of said radial bore so that the first and second portions become unconnected to allow removal of the feeder from the conveyor.

8. A feeder according to claim 7 wherein said first and second portions of said split collar include complementary mating channels having an axis parallel to the axis of said conveyor.

9. A feeder according to claim 7 wherein said split collar includes lock means for engaging said conveyor in said radial bore for preventing movement of said feeder with respect to said conveyor.

10. A feeder according to claim 7 wherein
    said drop tube means, said pan means and said grill means are plastic; and wherein
    a weight is mounted within said conical portion of said pan.

11. A feeder to receive feed from a conveyor comprising:
    pan means, including an inward facing circumferential groove, for retaining and presenting feed;
    a grill having a central bore and an outer circumferential flange removably mounting said grill to said pan means in said circumferential groove; and
    drop tube means, extending through said central bore, for receiving a conveyor at a proximal end and dispensing feed at a distal end adjacent to said pan means;
    a hinge means pivotally interconnecting said grill means and pan means to permit said pan means to pivot about an axis parallel to a conveying axis of said conveyor;
    wherein said hinge forces a leading edge of said circumferential groove to ride upon a horizontal surface of said flange during pivoting; and
    wherein said flange is split at a point substantially diagonally opposed said hinge means to permit removal of said flange from said circumferential groove.

12. A feeder according to claim 11 wherein said flange is split at a point substantially diagonally opposed said hinge means to permit removal of said flange from said circumferential groove.

13. A feeder according to claim 11 wherein said flange has an L-shaped cross-section with a vertical leg received in said circumferential groove and a horizontal leg in and extending substantially from said circumferential groove.

14. A feeder according to claim 13 including a split in said flange to permit removal of said flange from said circumferential groove.

15. A feeder according to claim 14 wherein said split in said horizontal leg is narrow so as to provided effectively a continuous horizontal flange while permitting removal of said flange from said circumferential groove by initial radial or axial forces.

16. A feeder according to claim 15 wherein said split in said vertical leg is substantially wider than said split in said horizontal leg.

17. A feeder according to claim 11 wherein;
    said drop tube means, said pan means and said grill means are plastic; and wherein a weight is mounted within said conical portion of said pan.

18. A feeder to receive feed from a conveyor comprising:

pan means for retaining and presenting feed;

a grill having a central bore and being mounted to said pan means at an outer periphery;

drop tube means, extending through said central bore, for receiving a conveyor at a radial bore at an proximal end and dispensing feed at a distal end of an axial bore adjacent to said pan means;

said drop tube means, said pan means, and said grill are plastic;

said pan means includes central conical portion extending into said distal end of said drop tube means; and a weight mounted within said conical portion of said pan.

* * * * *